3,142,659
HALOGEN CONTAINING VINYL RESINS STABILIZED WITH IRON-POLYOL COMBINATION
Robert A. Buckley, Bedford, Ohio, assignor to Ferro Corporation, Cleveland, Ohio, a corporation of Ohio
No Drawing. Filed June 9, 1961, Ser. No. 116,202
8 Claims. (Cl. 260—45.75)

This invention relates generally to a halogen containing vinyl resin composition which has been compounded so as to minimize the deleterious effects of heat.

More particularly, this invention relates to a new and novel composition of matter, and method of achieving same, whereby certain compounds, namely, compounds of iron and polyhydric alcohols, when combined in a vinyl resin composition in certain relative amounts, result in a degree of heat stabilization far superior to the individual contribution of either if incorporated singly.

One of the more important commercial applications of halogen containing vinyl resins is for rigid, or semi-rigid pipe and tubing, construction materials such as light fixtures, etc.

One of the disadvantages experienced heretofore however, has been a heat induced degradation of the halogen containing vinyl resin, encountered during the heat processing of same, such degradation making itself manifest as an unsightly discoloration. The products so discolored are therefore unacceptable for commercial and domestic use.

In an effort to overcome such undesirable discoloration, a number of stabilizing compounds and combinations of compounds have been used in the past. Among popular stabilizers, the various polyols have occupied a dominant position. Polyols most frequently used in the past have been pentaerythritol and sorbitol. Glycerine, mannitol and other similar compounds also serve quite well as stabilizers, but generally yield to pentaerythritol or sorbitol due to cost or compatability problems.

Reviewing the art briefly, Hecker in U.S. Patent No. 2,943,070 teaches the use of pentaerythritol to overcome the harmful effects of iron in vinyl resins, said iron being present in a resin in amounts equivalent to aproximately 4.2% metallic iron based on 100 parts by weight of resin.

Elliott, in U.S. Patent No. 2,861,052 teaches the use of a polyol plus a Friedel-Crafts catalyst to counteract heat degradation of vinyl resins. Elliott omitted iron from his list of desirable Friedel-Crafts cations however, since he felt iron would defeat the purpose of the invention and was highly undesirable.

E. J. Arlman (Journal Polymer Science, vol. 12, 543–6 [1954]) pointed out that iron as a contaminant from processing equipment corrosion has an adverse effect on stability and is probably responsible for what had hitherto been regarded as an autocatalytic degradation effect.

Summarizing the prior attitudes and art practices, iron in any form has generally been considered highly undesirable for use in conjunction with halogen containing vinyl resins because of its accepted role as a catalyst in hastening heat degradation in said vinyls. When its use was required as a pigment, it was looked upon as a contaminating, but necessary, evil.

Surprisingly, contrary to all expectations, I have discovered that iron compounds are highly beneficial additives to vinyls in overcoming heat induced instability. Specifically, I have discovered synergism in the combination of polyhydric alcohols and iron compounds when added to halogen containing vinyl resins in predetermined amounts, and under controlled conditions. By "controlled" conditions is meant the form of the iron (although not critical) is known, and added in predetermined amounts, rather than as an impurity incidental to the addition of some other component of the vinyl system.

While iron or other contaminants cannot be wholly excluded by any feasible system of purification of the resin, plasticizer or filler, the system embodied in my invention is one in which the major portion of the iron present is intentionally introduced as a stabilizing ingredient, together with an appropriate quantity of a suitable polyol as hereinafter disclosed. It is a curious and surprising element of my discovery that the optimum amount of iron is above that normally occurring in resins, plasticizers and solvents, and most fillers, but below that normally present in asbestos fillers and related mineral substances.

The theory of polyol stabilization which is to be inferred from the prior art is that the function of the polyol has heretofore been to complex the unwanted iron impurities, such as found in asbestos fillers, resulting from processing equipment, etc., and so render them harmless so far as accelerating or catalyzing discoloration of the vinyl resin is concerned. Excessive amounts of iron have been found to promote decomposition of halogen containing vinyl resins, in addition to hastening discoloration.

We have proven however that rather than complexing with the iron, and thus preventing it from degrading the vinyl resin, the polyol actually reacts synergistically with the iron, when the polyol and iron are present in an optimum range of proportions, to improve the heat stability. The improvement to heat stability typified by our examples is far superior to that found when it is attempted to utilize an iron compound solely for stabilization absent a polyhydric alcohol, and the improvement is also far superior to that obtained by adding a polyhydric alcohol to a halogen containing vinyl resin, absent iron.

Although the most pronounced effect of my combination is noted in rigid vinyls (containing no plasticizer) a notable improvement, compared to a resin without my novel polyol-iron stabilizer, is still noted when a plasticizer up to 45 parts per 100 parts of resin, is incorporated into the combination.

Briefly and simply stated then, my invention comprises a heat stabilizer for halogen containing vinyl resins, which stabilizer consists essentially of the combination of a polyhydric alcohol and an iron compound, the two being added to said resin in a controlled and predetermined range relative to the resin, to overcome heat induced discoloration of said resin.

In addition to the polyhydric alcohol, pentaerythritol, a number of polyols were evaluated using the same systems outlined in Tables I and II and, although the advantages obtained with these alcohols in combination with iron, were not quite so spectactular as those obtained with pentaerythritol, the combination of iron and polyol in every case showed a resistance to heat induced blackening superior to systems containing either iron or polyhydric alcohol singly. The primary aliphatic polyhydric compounds which proved advantageous were sorbitol, mannitol, trimethylolpropane, trimethylolethane, dipentaerythritol, tripentaerythritol, etc.

I have found that polyhydric alcohols having at least two primary OH groups are particularly successful in the stabilizer compositions of this invention. Alcohols having secondary OH groups in addition to the primary OH groups are also useful and give good results in the practice of this invention. Since halogenated hydrocarbon resins are processed at from 250° F. it is necessary that the primary polyhydric alcohols used must be able to withstand processing temperatures without boiling off. Therefore the primary polyhydric alcohols must have a boiling point of at least 250° F.

It is also within the contemplation of this invention to use alcohols, as defined above, having ether or ester groups attached thereto; however, the alcohol having an ether or ester group must have at least two free primary OH groups and the alcohol before esterification or etherification must have had a total of at least three OH groups.

It is therefore an object of this invention to provide a new and improved heat stabilizer for halogen containing vinyl resins.

It is further an object of this invention to utilize iron in reducing heat induced discoloration in halogen containing vinyl resins.

It is a further object of this invention to provide a method for stabilizing halogen containing vinyl resins from the degrading effects of heat.

It is yet another object of this invention to provide an article of manufacture which has been stabilized against the deleterious effects of heat through the incorporation therein of a polyol-iron stabilizer.

Further, related objects will make themselves apparent as the specification progresses. Following then are illustrative examples of preferred embodiments of my invention, and these are obviously to be regarded as merely indicative of but just a few of the innumerable ramifications of my invention, and means for the practice thereof, without departing from its basic scope and tenor.

EXAMPLE I

The basic formulations set out in Table I below were compounded and tested individually in a conventional convection furnace at a temperature of 365° F. "Time to black" is the length of time which elapsed between introduction of the sample into the furnace, and completion of its color transition to black.

Throughout the series of examples set forth below, each batch was weighed out and mixed on a 2-roll steam-heated mill at 320° F. for 5 minutes, using conventional procedures, after which samples of the sheet thus formed were cut, on the order of 1 mm. x 5 cm. x 5 cm., then suspended in a forced convection oven at a temperature of 365° F. from which the samples were removed every 15 minutes for observation. All samples were tested simultaneously within each group of comparative samples, for maximum accuracy of duplication.

The stock of resin used in the test covered in Table I was the same in all cases. Since the scope of this invention includes the use not only of the iron compound and polyol as the total stabilizer system, but also the use of these materials in the presence of other metal carboxylates of known or presumed stabilizing properties, tests of various combinations of stabilizing ingredients were included.

Barium and cadmium in Table I were incorporated into the batch in the form of caprates while zinc, calcium, and magnesium were introduced as the stearates. Similar results were achieved incorporating the latter three metals as octoates.

Although the range of iron concentration of 0.005 to 0.01 per hundred parts of resin illustrated is the most effective one, the utility of the iron is not to be sharply limited by these values, and its beneficial effects are clearly distinguishable over the range 0.001 to 0.1%. At concentrations exceeding 0.1% Fe-induced discoloration becomes objectionable. At concentrations less than 0.001% Fe the beneficial effect is hardly detectable. Similarly the range of polyol is illustrated by the preferred range 1.1–1.2% shown in Table I. But this invention is not to be limited to this concentration range. The range of useful concentration of polyol appears to be about 0.2 to 5.0 parts per hundred parts of resin. The upper range of concentration of polyol is not limited, as in the case of iron, by any observed adverse effect on the chemical integrity of the polymer. However, considerations of compatibility and of processing characteristics probably limit the upper usable concentration to 5 parts polyol per hundred parts of resin.

From the foregoing Table I, it will be seen that the addition of either iron, or pentaerythritol in quantities considered optimum when they are used together, when used singly in the same respective quantities, have either no beneficial effect, or actually depress stability.

It will be noted (Trial 14) that iron-pentaerythritol, in the absence of supporting metal combinations such as Ba—Cd, Ca—Zn, or Ca—Zn—Mg, gave excellent long term stability. However, without such supporting metals, an early slight yellowish to pinkish discoloration was apparent in trial #14. Thus it can be seen that the essence of my invention lies in the iron-polyol combination alone, although for certain requirements, its effect is enhanced by the addition of said supporting metals.

While I have used calendering resins in my preferred embodiments, it is to be understood that my invention would apply equally to plastisol dispersions, the phenomenon of discoloration occurring in both in substantially the same way and under essentially the same conditions.

EXAMPLE II

The following series of tests were set up to demonstrate the utility of this combination in a variety of copolymers of poly vinyl chloride.

The VYNW and VYHH resins are both vinyl chloride acetate copolymers containing 3–5% and 13–15% acetate respectively. Geon 202 is a vinyl-chloride-vinylidene chloride copolymer with a high vinyl chloride content, having 90% vinyl chloride and 10% vinylidene chloride. The exact ratio is not published by B. F. Goodrich Chemical Company, its producer, but it has a specific gravity of 1.41, a maximum ash content of 0.1% and a specific viscosity of 0.38–0.42 according to the physical

*Table I*

[Parts per hundred of resin]

| | Resin [1] | Metal | | | | | Polyol (Pentaerythritol) | Iron (added as sulfate) | Stability (minutes to black) at 365° F. |
|---|---|---|---|---|---|---|---|---|---|
| | | Ba | Cd | Zn | Ca | Mg | | | |
| 1 | 100 | 0.08 | 0.12 | | | | | | 60 |
| 2 | 100 | 0.08 | 0.12 | | | | | 0.01 | 60 |
| 3 | 100 | 0.08 | 0.12 | | | | 1.2 | | 45 |
| 4 | 100 | 0.08 | 0.12 | | | | 1.2 | 0.005 | 75 |
| 5 | 100 | 0.08 | 0.12 | | | | 1.2 | 0.01 | 90 |
| 6 | 100 | | | 0.05 | 0.03 | | | | 45 |
| 7 | 100 | | | 0.05 | 0.03 | | 1.12 | 0.005 | 75 |
| 8 | 100 | | | 0.05 | 0.03 | | 1.12 | 0.01 | 90 |
| 9 | 100 | | | 0.05 | 0.03 | | | | 15 |
| 10 | 100 | | | 0.05 | 0.015 | 0.015 | 1.12 | | 45 |
| 11 | 100 | | | 0.05 | 0.015 | 0.015 | 1.12 | 0.005 | 75 |
| 12 | 100 | | | 0.05 | 0.015 | 0.015 | 1.12 | 0.01 | 90 |
| 13 | 100 | | | | | | 1.20 | | (²) |
| 14 | 100 | | | | | | 1.20 | 0.01 | 105 |

[1] The resin was an emulsion-polymerized homopolymeric poly (vinyl chloride).
[2] Black off the mill.

properties and test data set forth in B. F. Goodrich Chemical Company's service bulletin G-7, revised October 1954.

*Table II.—Resin Variations*

[Parts per hundred of resin]

| Resin | Zn | Ca | Polyol Pentaerythritol | Iron (added as sulfate) | Minutes to Black at 365° F. |
|---|---|---|---|---|---|
| 100 VYNW | 0.05 | 0.03 | 1.1 | | 60 |
| 100 VYNW | 0.05 | 0.03 | 1.1 | 0.01 | 105 |
| 100 VYHH | 0.05 | 0.03 | 1.1 | | 30 |
| 100 VYHH | 0.05 | 0.03 | 1.1 | 0.01 | 45 |
| 100 Geon 202 | 0.05 | 0.03 | 1.1 | | 40 |
| 100 Geon 202 | 0.05 | 0.03 | 1.1 | 0.01 | 85 |

From Table II it will be seen that in a variety of vinyl-chloride copolymers, the effect of the iron-polyol combination was far superior to the polyol (pentaerythritol) used singly. Again, the zinc and calcium were added as the stearates.

In order to illustrate the beneficial effect of the presence of iron as used in my invention, irrespective of whether it is added to the composition as an organic or inorganic compound, further tests were run evaluating inorganic iron compounds namely, iron chloride and iron oxide as well as organic iron compounds. From the following it will be noted that organic, or inorganic combined forms of iron, i.e., salts, oxides, etc., all exhibit advantages.

Although iron oxide imparted a reddish color to the vinyl resin, it will be noted that it nevertheless extended long term heat stability substantially over the addition of pentaerythritol absent a source of iron.

*Table III.—Iron Compounds*

[PHR[1]]

| PVC Resin | Ba | Cd | Polyol Pentaerythritol | Iron | Minutes to black at 365° F. |
|---|---|---|---|---|---|
| 100 | 0.08 | 0.12 | 1.2 | None | 60 |
| 100 | 0.08 | 0.12 | 1.2 | 0.01 (added as chloride) | 105 |
| 100 | 0.08 | 0.12 | 1.2 | 0.01 (added as oxide) | 105 |
| 100 | 0.08 | 0.12 | 1.2 | 0.009 (added as naphthenate) | 75 |
| 100 | 0.08 | 0.12 | 1.2 | 0.009 (added as tallate) | 75 |

[1] PHR—parts per hundred of resin.

The resin used in this example was the same as utilized for the test runs set forth in Table I.

In order to illustrate the utility of my invention in the presence of plasticizers, the following compositions were run and tested using the same basic resin as set forth in Example I.

*Table IV.—Effect of Plasticizers*

[PHR]

| PVC Resin | Plasticizer | Metal | | Polyol Pentaerythritol | Iron (as sulfate) | Minutes to black at 365° F. |
|---|---|---|---|---|---|---|
| | | Zn | Ca | | | |
| 100 | | 0.05 | 0.03 | 1.1 | | 45 |
| 100 | | 0.05 | 0.03 | 1.1 | 0.01 | 90 |
| 100 | 5 (DOP[1]) | 0.05 | 0.03 | 1.1 | | 75 |
| 100 | 5 (DOP) | 0.05 | 0.03 | 1.1 | 0.01 | 120 |
| 100 | 10 (DOP) | 0.05 | 0.03 | 1.1 | | 75 |
| 100 | 10 (DOP) | 0.05 | 0.03 | 1.1 | 0.01 | 120 |
| 100 | 25 (DOP) | 0.05 | 0.03 | 1.1 | | 70 |
| 100 | 25 (DOP) | 0.05 | 0.03 | 1.1 | 0.01 | 120 |
| 100 | 45 (DOP) | 0.05 | 0.03 | 1.1 | | 60 |
| 100 | 45 (DOP) | 0.05 | 0.03 | 1.1 | 0.01 | 75 |

[1] Dioctyl phthalate.

Table IV above illustrates that, until the level of plasticizer reaches the order of 45 PHR, the incremental improvement resulting from the stabilizing synergism of iron-polyol, over polyol, in the absence of iron, remains high. And, even though there is measurable improvement at 45 PHR plasticizer, I feel that, beyond 50 or 60 PHR of plasticizer, the synergistic stabilization effect of my iron-polyol stabilizer would probably be insignificant.

Table V illustrates the utility of a wide variety of polyols, other components of the system remaining constant.

*Table V.—Polyol Variations*

[PHR]

| Resin | Ba | Cd | Polyol | Iron (added as sulfate) | Minutes to Black |
|---|---|---|---|---|---|
| 100 | 0.08 | 0.12 | 1.0 dipentaerythritol | | 75 |
| 100 | 0.08 | 0.12 | do | 0.01 | 105 |
| 100 | 0.08 | 0.12 | 1.0 trimethylolpropane | | 60 |
| 100 | 0.08 | 0.12 | do | 0.01 | 90 |
| 100 | 0.08 | 0.12 | 1.0 pentaerythritol Ethyl Ether | | 60 |
| 100 | 0.08 | 0.12 | do | 0.01 | 75 |
| 100 | 0.03 | 0.05 | 0.5 sorbitol | | 45 |
| 100 | 0.03 | 0.05 | do | 0.01 | 60 |
| 100 | 0.03 | 0.05 | 0.5 mannitol | | 45 |
| 100 | 0.03 | 0.05 | do | 0.01 | 60 |

From Table V it can be seen that, while pentaerythritol gives best results, four different additional polyols provided readily measurable utility from the stabilization standpoint.

Having thus described in full detail all the pertinent aspects of my invention, including numerous preferred embodiments thereof which are illustrative however of but just a few of the variations possible within the scope of my invention, I particularly point out and distinctly claim:

1. The method of producing a heat stabilized halogen containing vinyl resin composition comprising the steps of intimately admixing (1) about 100 parts by weight total resin of at least one resin of the group consisting of polyvinyl chloride, a copolymer of vinyl chloride and vinyl acetate containing about 3 to 15% vinyl acetate, and a copolymer of vinyl chloride and vinylidene chloride, containing about 90% vinyl chloride, (2) from about 0.001 to about 0.1 part per 100 parts of said resin of iron which is part of an iron salt, said parts of said iron present in an amount above that normally introduced into said composition via resins, plasticizers, and solvents as an impurity, but below that normally present in asbestos fillers and related mineral substances as an impurity, and (3) from about 0.2 to about 5.0 parts per 100 parts of said resin, of an aliphatic polyhydric alcohol having 2 to 8 hydroxyl groups, at least two of which are primary hydroxyl groups and a boiling point in excess of 250° F. and forming said resin into a predetermined shape.

2. The method of producing a heat stabilized halogen containing vinyl resin composition comprising the steps of intimately admixing (1) about 100 parts by weight total resin of at least one resin of the group consisting of polyvinyl chloride, a copolymer of vinyl chloride and vinyl acetate containing about 3 to 15% vinyl acetate, and a copolymer of vinyl chloride and vinylidene chloride, containing about 90% vinyl chloride, (2) from about 0.001 to about 0.1 part per 100 parts of said resin of iron which is part of an iron salt, said parts of said iron present in an amount above that normally introduced into said composition via resins, plasticizers, and solvents as an impurity, but below that normally present in asbestos fillers and related mineral substances as an impurity, and (3) from about 0.2 to about 5.0 parts per 100 parts of said resin of a compound selected from the class consisting of aliphatic polyhydric alcohols having 2 to 8 hydroxyl groups, at least two of which are primary hydroxyl groups and a boiling point in excess of 250° F., esters of aliphatic polyhydric alcohols, said esters having 2 to 8 hydroxyl groups, at least two of which are primary hydroxyl groups and a boiling point in excess of 250° F., and ethers of aliphatic polyhydric alcohols, said ethers having 2 to 8 hydroxyl groups, at least two of which are primary hydroxyl groups and a boiling point in excess of 250° F., and forming said resin into a predetermined shape.

3. The method of claim 1 wherein the iron salt is iron sulphate.

4. The method of claim 1 wherein the iron salt is iron sulphate and the polyhydric alcohol is pentaerythritol.

5. The method of claim 1 wherein the iron salt is iron chloride.

6. The method of claim 1 wherein the iron salt is iron chloride and the polyhydric alcohol is pentaerythritol.

7. The method of claim 2 wherein the iron salt is iron sulphate.

8. The method of claim 2 wherein the iron salt is iron sulphate and the compound of step (3) is pentaerythritol.

References Cited in the file of this patent

UNITED STATES PATENTS

| | | |
|---|---|---|
| 2,861,052 | Elliott | Nov. 18, 1958 |
| 2,943,070 | Hecker et al. | June 28, 1960 |

OTHER REFERENCES

Royals: "Advanced Organic Chemistry," page 467, Constable Co., Ltd., London, 1954.